US011591079B2

(12) United States Patent
Shundo et al.

(10) Patent No.: US 11,591,079 B2
(45) Date of Patent: Feb. 28, 2023

(54) DRIVE TUBE AND SWASHPLATE TRUNNION ASSEMBLY WITH CYLINDRICAL BEARINGS

(71) Applicant: Bell Textron Inc., Fort Worth, TX (US)

(72) Inventors: Ken Shundo, Keller, TX (US); Bryan Baskin, Arlington, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 276 days.

(21) Appl. No.: 17/081,423

(22) Filed: Oct. 27, 2020

(65) Prior Publication Data

US 2022/0126992 A1    Apr. 28, 2022

(51) Int. Cl.
*B64C 27/605* (2006.01)
*B64D 35/00* (2006.01)

(52) U.S. Cl.
CPC ............ *B64C 27/605* (2013.01); *B64D 35/00* (2013.01)

(58) Field of Classification Search
CPC ....... B64C 27/605; B64D 35/00; F16C 29/02; F16D 3/06; Y10T 403/7117; Y10T 403/7182
See application file for complete search history.

(56) References Cited

U.S. PATENT DOCUMENTS

| 4,051,696 | A | * | 10/1977 | Mason | ...................... F16D 3/06 464/83 |
| 9,039,373 | B2 | | 5/2015 | Stamps | |
| 9,193,454 | B2 | | 11/2015 | Modrzejewski et al. | |
| 2019/0023386 | A1 | * | 1/2019 | Rauber | .................... B64C 27/35 |
| 2019/0382107 | A1 | | 12/2019 | Shimek et al. | |
| 2020/0377208 | A1 | * | 12/2020 | Marshall | ................. F01D 25/16 |

FOREIGN PATENT DOCUMENTS

BR    102013027001 A2 *  10/2017  ........... B64C 27/605

* cited by examiner

*Primary Examiner* — Christopher Verdier
*Assistant Examiner* — Jesse M Prager
(74) *Attorney, Agent, or Firm* — Akona IP

(57) ABSTRACT

In one embodiment of the present disclosure, there is provided a drive tube and swashplate trunnion assembly. The drive tube and swashplate trunnion assembly includes a drive tube having a plurality of grooves formed on an outer surface of the drive tube; a swashplate trunnion having a plurality of grooves formed on an inner surface of the swashplate trunnion, wherein individual grooves of the plurality of grooves on the swashplate trunnion mate with individual grooves of the plurality of grooves on the drive tube to form a plurality of channels; and a plurality of cylindrical bearings, wherein each of said cylindrical bearings is disposed within an individual channel of the plurality of channels.

14 Claims, 7 Drawing Sheets

DRIVE TUBE AND SWASHPLATE TRUNNION ASSEMBLY WITH CYLINDRICAL BEARINGS

GOVERNMENT RIGHTS

This invention was made with United States Government support under Agreement No. W9124P-19-9-0001 awarded by the Army Contracting Command-Redstone Arsenal to the AMTC and a related AMTC Project Agreement No. 19-08-006 with Bell Textron Inc. The United States Government has certain rights in the invention.

TECHNICAL FIELD

This disclosure relates generally to aircraft, and more particularly, though not exclusively, to systems and methods for a drive tube and swashplate trunnion assembly.

BACKGROUND

Traditionally, the vertical flight of an aircraft, such as a helicopter, has been controlled using a swashplate trunnion assembly that provides for collective control in the aircraft. For example, the swashplate trunnion may slide up and down a helicopter's drive tube so that the angle of each of the helicopter rotor blades may be changed simultaneously thereby increasing or decreasing the altitude of the helicopter. In conventional swashplate trunnion systems, the drive tube and swashplate trunnion have coated involute splines that react to torsional and sliding loads. When the coatings on the drive tube or swashplate trunnion wear out, the entire rotor system must be disassembled to replace the worn out part, and replacement parts are costly. Systems and methods providing for an improved drive tube and swashplate trunnion assembly are desired.

SUMMARY

According to one aspect of the present disclosure, there is provided a drive tube and swashplate trunnion assembly having replaceable cylindrical bearings. The drive tube and swashplate trunnion assembly includes a drive tube having a plurality of grooves formed on an outer surface of the drive tube; a swashplate trunnion having a plurality of grooves formed on an inner surface of the swashplate trunnion, wherein individual grooves of the plurality of grooves on the swashplate trunnion mate with individual grooves of the plurality of grooves on the drive tube to form a plurality of channels; and a plurality of cylindrical bearings, wherein each of said cylindrical bearings is disposed within an individual channel of the plurality of channels. Such a drive tube and swashplate trunnion assembly may be assembled by installing a drive tube including a plurality of grooves formed on an outer surface of the drive tube, installing a swashplate trunnion including a plurality of grooves formed on an inner surface of the swashplate trunnion, wherein individual grooves of the plurality of grooves on the swashplate trunnion are mated with individual grooves of the plurality of grooves on the drive tube to form a plurality of channels, wherein the swashplate trunnion has a first surface and an opposing second surface, and wherein the swashplate trunnion includes a base on the first surface; and installing plurality of cylindrical bearings having a first end and an opposing second end, wherein each of the cylindrical bearings is positioned within an individual channel of the plurality of channels with the first end facing the first surface of the swashplate trunnion, and wherein at least a portion of the first end of each of the plurality of cylindrical bearings is enclosed by the base on the first surface of the swashplate trunnion.

DETAILED DESCRIPTION

Figure 1A:
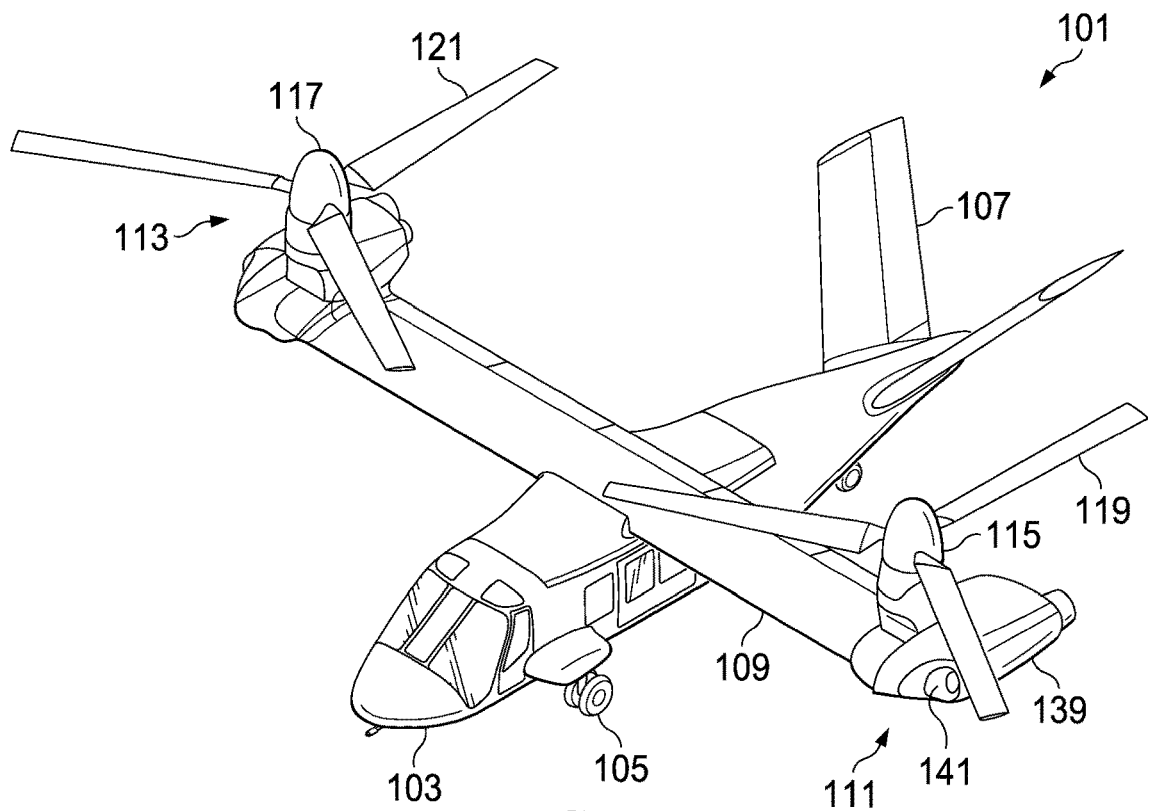
FIG. 1A is a perspective view of a tiltrotor aircraft in helicopter mode, in accordance with certain embodiments.

A drive tube and swashplate trunnion assembly having cylindrical bearings is disclosed herein. A drive tube and swashplate trunnion assembly includes a drive tube having a plurality of grooves formed on an outer surface of the drive tube; a swashplate trunnion having a plurality of grooves formed on an inner surface of the swashplate trunnion, wherein individual grooves of the plurality of grooves on the swashplate trunnion mate with individual grooves of the plurality of grooves on the drive tube to form a plurality of channels; and a plurality of cylindrical bearings, wherein each of said cylindrical bearings is disposed within an individual channel of the plurality of channels. Such a drive tube and swashplate trunnion assembly may be assembled by installing a drive tube including a plurality of grooves formed on an outer surface of the drive tube, installing a swashplate trunnion including a plurality of grooves formed on an inner surface of the swashplate trunnion, wherein individual grooves of the plurality of grooves on the swashplate trunnion are mated with individual grooves of the plurality of grooves on the drive tube to form a plurality of channels, wherein the swashplate trunnion has a first surface and an opposing second surface, and wherein the swashplate trunnion includes a base on the first surface; and installing plurality of cylindrical bearings having a first end and an opposing second end, wherein each of the cylindrical bearings is positioned within an individual channel of the plurality of channels with the first end facing the first surface of the swashplate trunnion, and wherein at least a portion of the first end of each of the plurality of cylindrical bearings is enclosed by the base on the first surface of the swashplate trunnion. In yet another aspect, a drive tube and swashplate trunnion assembly further includes a cap on the second surface of the swashplate trunnion enclosing the second end of each of the plurality of cylindrical bearings. In yet another aspect, the plurality of cylindrical bearings includes a coating.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

The following disclosure uses the phrases "in an embodiment" or "in embodiments," which may each refer to one or more of the same or different embodiments. Furthermore, the terms "comprising," "including," "having," and the like, as used with respect to embodiments of the present disclosure, are synonymous. In the following disclosure, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. The use of terms such as "above," "below," "upper," "lower," "top," "bottom," "first," "second," or other similar terms to describe a spatial relationship between various components or to describe the spatial orientation of aspects of such components, should be understood to describe a relative relationship between the components or a spatial orientation of aspects of such components, respectively, and do not imply a desired or required orientation or order.

As used herein, the terms "swashplate trunnion" and "swashplate trunnion sleeve" may be used interchangeably. Further, the present disclosure may repeat reference numerals and/or letters in the various examples where like numerals designate like parts throughout, and in which is shown, by way of illustration, embodiments that may be practiced. This repetition is for the purpose of simplicity and clarity and does not in itself dictate a relationship between the various embodiments and/or configurations discussed. It is to be understood that other embodiments may be utilized, and structural or logical changes may be made without departing from the scope of the present disclosure. For convenience, numerals that designate multiples of a same element may be used to refer to the collection of the same element. When used to describe a range of dimensions, the phrase "between X and Y" represents a range that includes X and Y. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The drawings are not necessarily to scale.

Example embodiments that may be used to implement the features and functionality of this disclosure will now be described with more particular reference to the attached FIGURES.

FIGS. 1A-1C and 2A-2B illustrate various example aircraft in accordance with certain embodiments, as discussed further below.

Figure 1B:
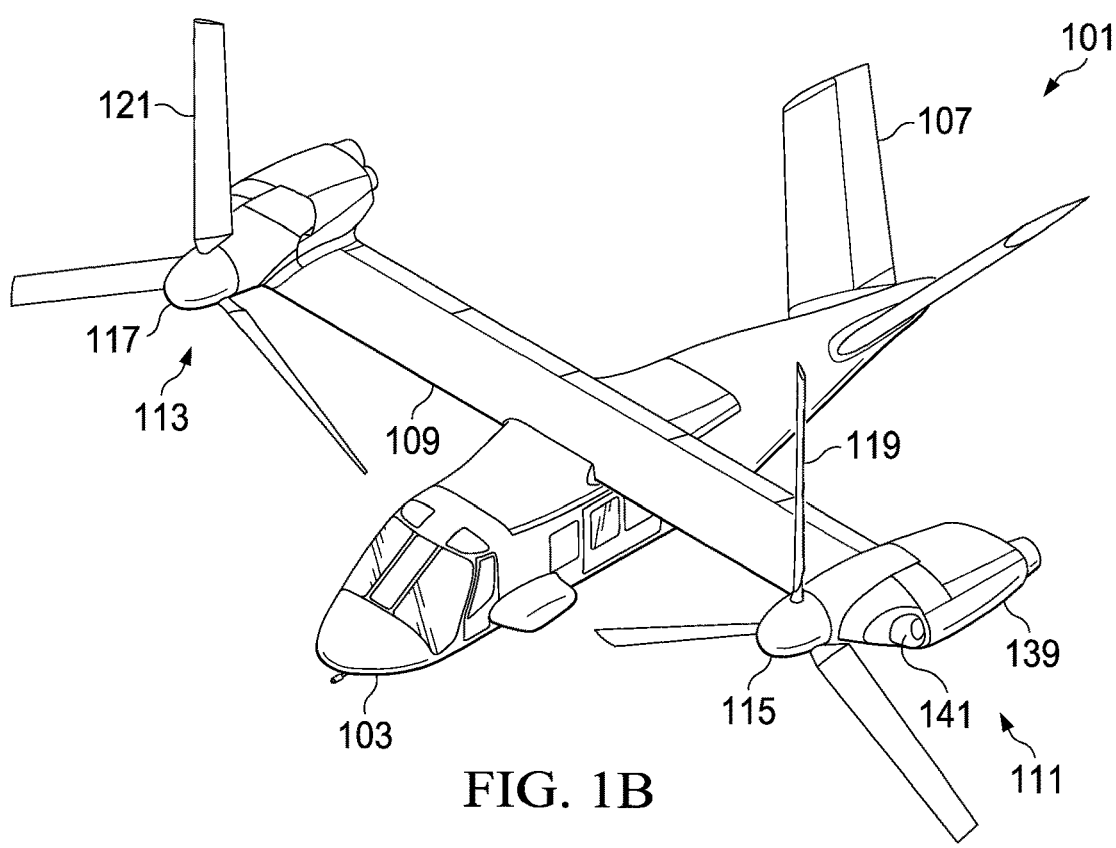
FIGS. 1B-1C are perspective views of a tiltrotor aircraft in airplane mode, in accordance with certain embodiments.
Figure 1C:
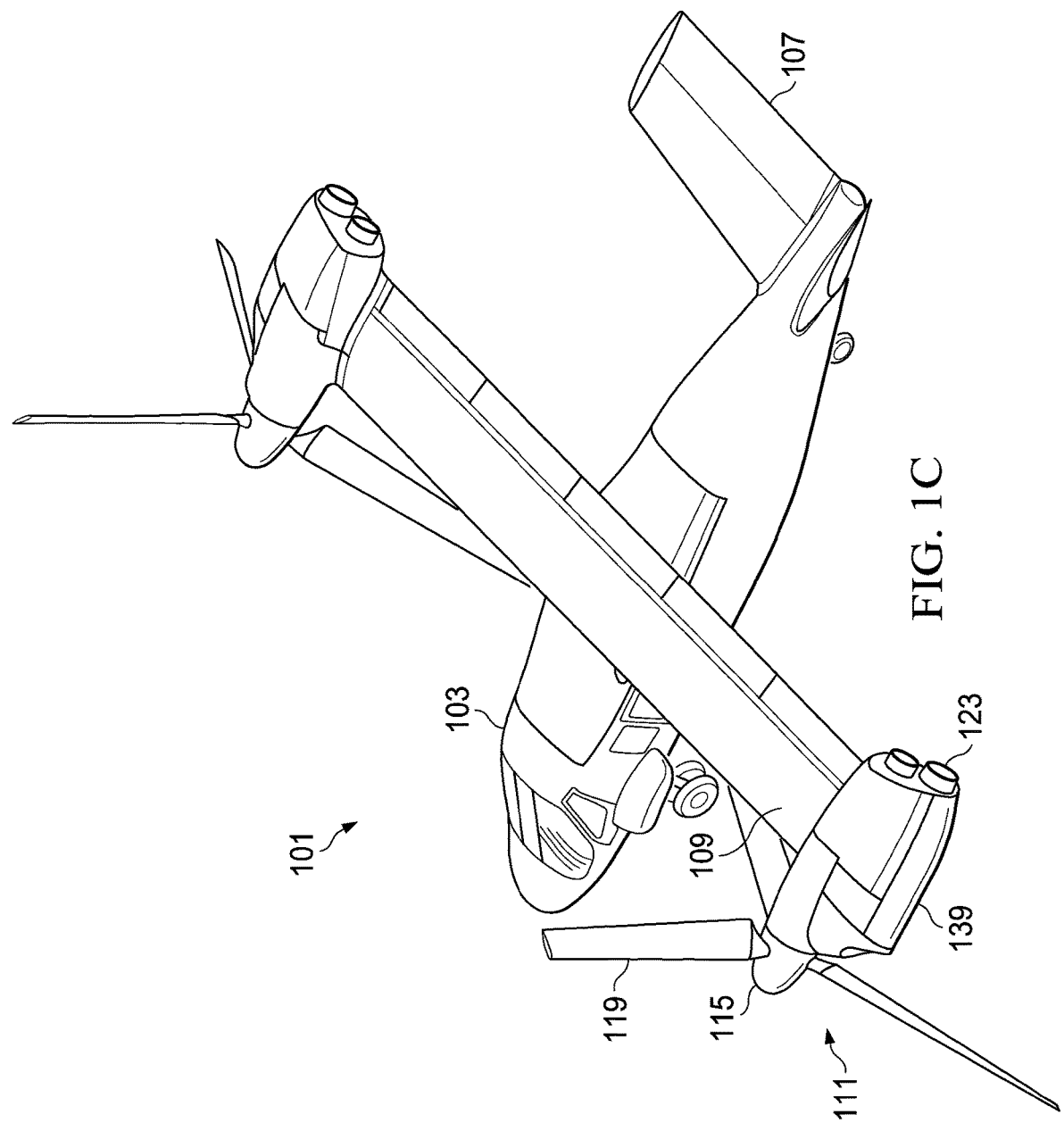

Referring to FIGS. 1A-1C, a tiltrotor aircraft 101 is illustrated that may include a drive tube and swashplate trunnion assembly having cylindrical bearings. Tiltrotor aircraft 101 may include a fuselage 103, a landing gear 105, a tail member 107, a wing 109, a propulsion system 111, and a propulsion system 113. Each propulsion system 111 and 113 includes a fixed engine and a rotatable proprotor 115 and 117, respectively. Each rotatable proprotor 115 and 117 have a plurality of rotor blades 119 and 121, respectively, associated therewith. The position of proprotors 115 and 117, as well as the pitch of rotor blades 119 and 121, can be selectively controlled in order to selectively control direction, thrust, and lift of tiltrotor aircraft 101.

FIG. 1A illustrates tiltrotor aircraft 101 in helicopter mode, in which proprotors 115 and 117 are positioned substantially vertical to provide a lifting thrust. FIGS. 1B and 1C illustrate tiltrotor aircraft 101 in an airplane mode, in which proprotors 115 and 117 are positioned substantially horizontal to provide a forward thrust in which a lifting force is supplied by wing 109. It should be appreciated that tiltrotor aircraft can be operated such that proprotors 115 and 117 are selectively positioned between airplane mode and helicopter mode, which can be referred to as a conversion mode.

The propulsion system 113 is substantially symmetric to the propulsion system 111; therefore, for sake of efficiency certain features will be disclosed only with regard to propulsion system 111. However, one of ordinary skill in the art would fully appreciate an understanding of propulsion system 113 based upon the disclosure herein of propulsion system 111. Further, propulsion systems 111 and 113 are illustrated in the context of tiltrotor aircraft 101; however, propulsion systems 111 and 113 can be implemented on other tiltrotor aircraft. For example, an alternative embodiment may include a quad tiltrotor that has an additional wing member aft of wing 109, the additional wing member can have additional propulsion systems similar to propulsion systems 111 and 113. In another embodiment, propulsion systems 111 and 113 can be used with an unmanned version of tiltrotor aircraft 101. Further, propulsion systems 111 and 113 can be integrated into a variety of tiltrotor aircraft configurations.

As shown in FIG. 1C, propulsion system 111 includes an engine 123 that is fixed relative to wing 109. Engine 123 can be housed and supported in an engine nacelle 139. Engine nacelle 139 can include an inlet 141, aerodynamic fairings, and exhaust, as well as other structures and systems to support and facilitate the operation of engine 123. An aircraft, such as tiltrotor aircraft 101, may include one or more gearboxes housing a plurality of gears. A gearbox may transmit power from a power source (e.g., engine 123) to an object to be moved (e.g., proprotor 115).

Figure 2A:
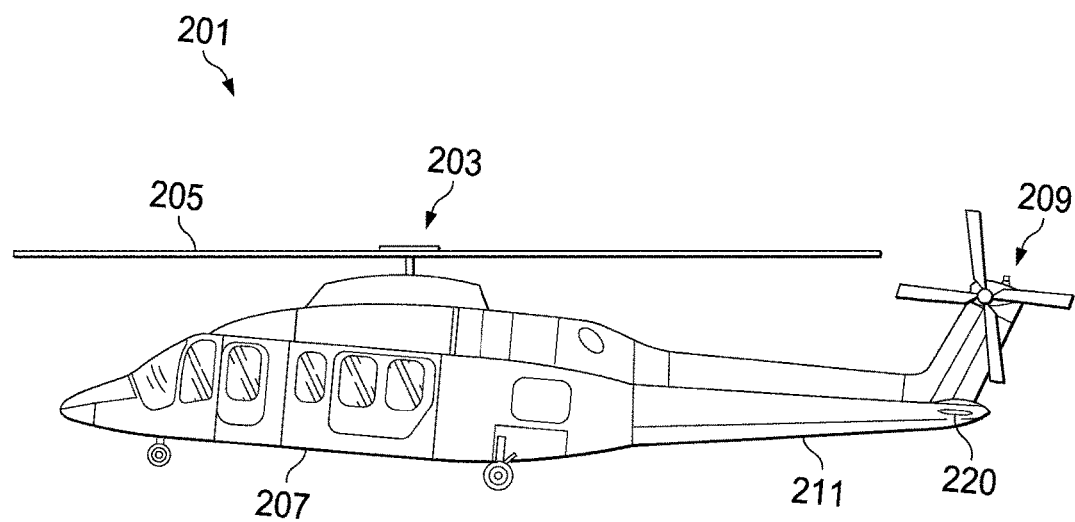
FIG. 2A is a side view of a rotorcraft, in accordance with certain embodiments.
Figure 2B:
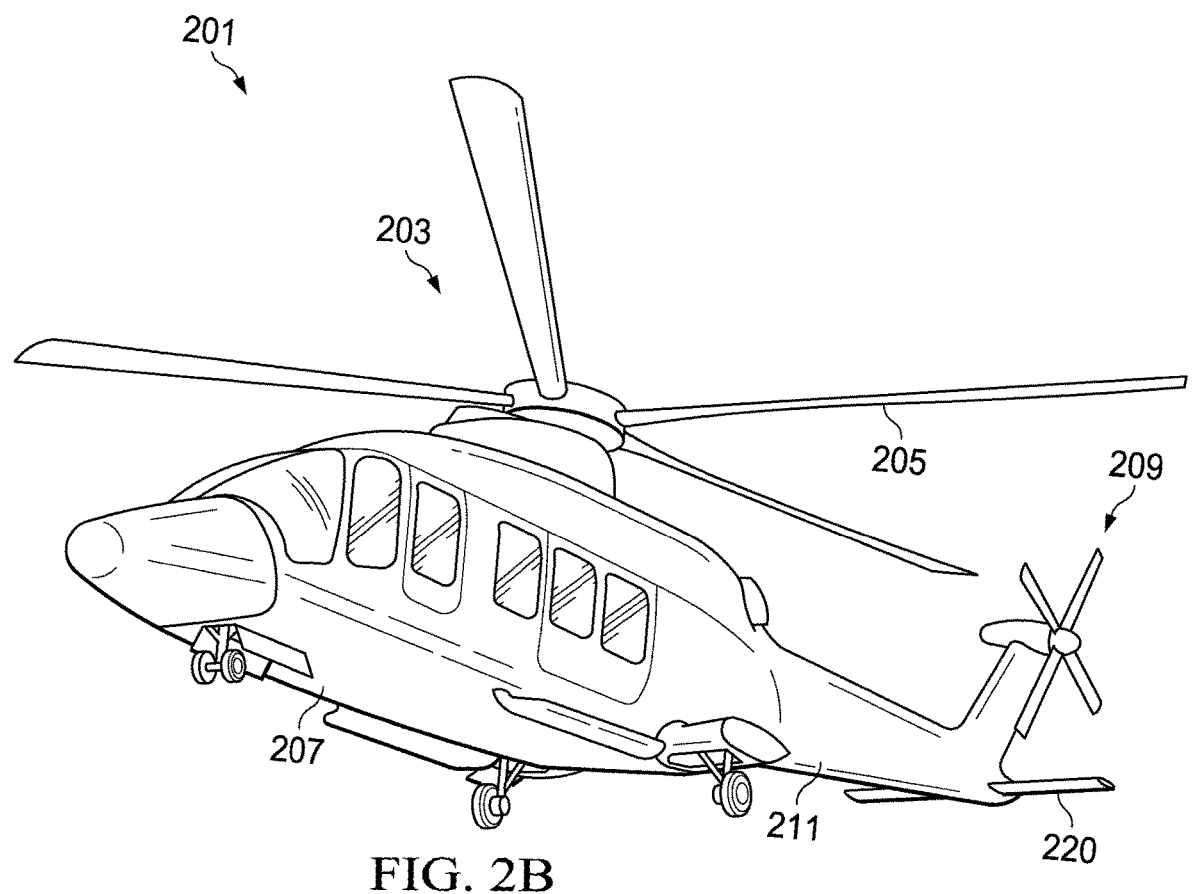
FIG. 2B is a perspective view of a rotorcraft, in accordance with certain embodiments.

FIGS. 2A-2B illustrate an example embodiment of a rotorcraft 201 that may include a drive tube and swashplate trunnion assembly having cylindrical bearings. FIG. 2A illustrates a side view of rotorcraft 201, while FIG. 2B illustrates a perspective view of rotorcraft 201. Rotorcraft 201 has a rotor system 203 with a plurality of rotor blades 205. The pitch of each rotor blade 205 may be managed or adjusted in order to selectively control direction, thrust, and lift of rotorcraft 201. Rotorcraft 201 further includes a fuselage 207, anti-torque system 209, an empennage 211, and a tail structure 220. In this example, tail structure 220 can represent a horizontal stabilizer. Torque is supplied to rotor system 203 and anti-torque system 209 using at least one engine. An aircraft, such as rotorcraft 201, may include one or more gearboxes housing a plurality of gears, including planetary gear systems.

It should be appreciated that tiltrotor aircraft 101 of FIGS. 1A-1C and rotorcraft 201 of FIGS. 2A-2B, are merely illustrative of a variety of aircraft having gearboxes with planetary gear systems that can be used to implement embodiments of the present disclosure. Other aircraft implementations can include, for example, fixed wing airplanes, hybrid aircraft, unmanned aircraft, gyrocopters, and a variety of helicopter configurations, among other examples. Moreover, it should be appreciated that even though aircraft are particularly well suited to implement embodiments of the present disclosure, the described embodiments can also be implemented using non-aircraft vehicles and devices.

The embodiments described throughout this disclosure provide numerous technical advantages, including reducing assembly and complexity of a planetary gear system having double helical gears. Example embodiments that may be used to implement the planetary gear system having double helical gears are described below with more particular reference to the remaining FIGURES.

Figure 3:
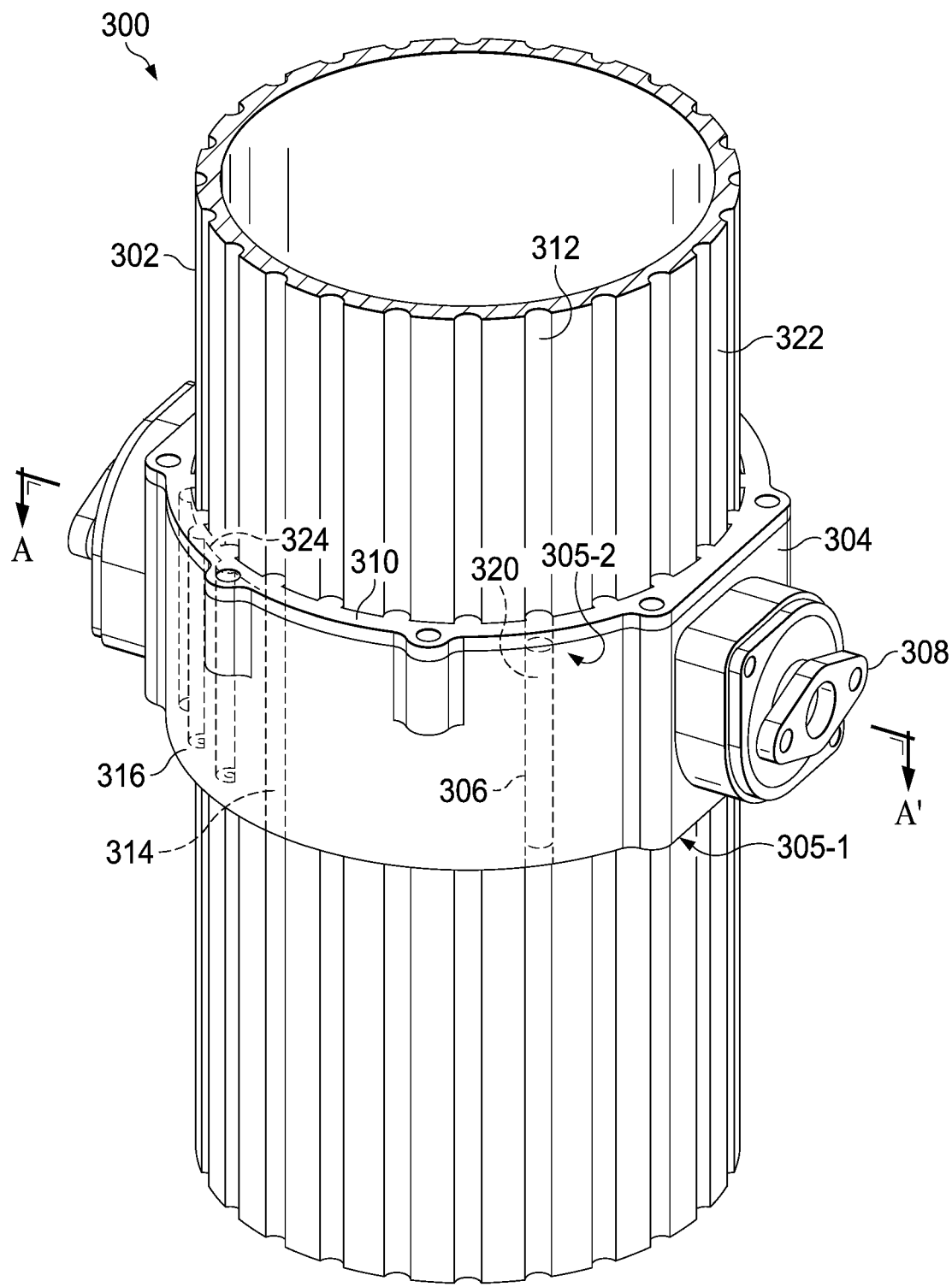
FIG. 3 is a perspective view of an exemplary a drive tube and swashplate trunnion assembly, in accordance with various embodiments.

Referring now to FIG. 3 a perspective view of an exemplary a drive tube and swashplate trunnion assembly of the present disclosure. The drive tube and swashplate trunnion assembly 300 includes a drive tube 302, a swashplate trunnion 304, and a plurality of cylindrical bearings 306. The drive tube 302 includes a plurality of grooves 312 on an outer surface 322 of the drive tube 302. The swashplate trunnion 304 includes a plurality of grooves 314 on an inner surface 324 of the swashplate trunnion 304. The plurality of grooves 312 of the drive tube 302 and the plurality of grooves 314 of the swashplate trunnion 304 are mated to form channels 320 to contain the cylindrical bearings 306. In such embodiments, the torque and sliding forces of the drive tube and swashplate trunnion assembly 300 are reacted through the cylindrical bearings 306, which are replaceable, as opposed to conventional configurations where these forces are reacted through the splines on the drive tube and the swashplate trunnion. The swashplate trunnion 304 may be a single component or may be a combination of multiple components (e.g., the swashplate trunnion 304 may include an insert (not shown) that has the plurality of grooves 314 on an inner surface 324). The swashplate trunnion 304 has a bottom surface 305-1 (e.g., a first surface) and a top surface 305-2 (e.g., an opposing second surface). The swashplate trunnion 304 includes a base 316 on the bottom surface 305-1. The base 316 may further contain a plurality of orifices (e.g., orifice 330 of FIG. 5), where an individual orifice exposes at least a portion of a cylindrical bearing disposed within a channel 320. The drive tube and swashplate trunnion assembly 300 further includes a cap 310, also referred to herein as a cap ring or a clamp plate, on a top surface 305-2 of the swashplate trunnion 304. The cap 310 may have any suitable size and shape to cover the channel 320 at the top surface 305-2 of the swashplate trunnion 304. In some embodiments, the cap 310 may further apply a preload force to the cylindrical bearings 306 in the channels 320. In some embodiments, the cap 310 may function to keep water and other fluids out of the channels 320. The cylindrical bearing 306 may be readily removed by moving the cap (e.g., sliding the cap ring up and away) from the top surface 305-2 of the swashplate trunnion 304 and by inserting a punch, a pin, a rod, or other similar tool into the orifice (e.g., orifice 330 of FIG. 5) in the base 316 to push the cylindrical bearing 306 out of the channel 320. In some embodiments, the orifice (e.g., orifice 330 of FIG. 5) may function to provide a drain path for any moisture (e.g., water or other fluids) that may get in the channels 320. In some embodiments, the cylindrical bearings 306 may not have a cylindrical shape, and, instead, may be a plurality of spherical bearings stacked within a channel 320. The swashplate trunnion 304 further includes a trunnion 308 for coupling to a rotating swashplate (not shown).

The drive tube 302 may have any suitable shape and/or size. For example, the drive tube 302 may be a hollow cylinder having any suitable diameter. The drive tube 302 may be made of any suitable material. For example, the drive tube 302 may be made of aluminum, aluminum alloys, titanium, titanium alloys, carbon steel, blue-tempered carbon steel, stainless steel, nickel based alloys, any other metal, or any combination of the preceding. The plurality of grooves 312 may be formed on the outer surface 322 of the drive tube 302 using any suitable technique, for example, by machining. The plurality of grooves 312 on the drive tube 302 may have any suitable size and shape, which may depend on the size and shape of the cylindrical bearings 306. For example, the grooves 312 of the drive tube 302 may have a semicircle cross section, such that, when mated with the grooves 314 of the swashplate trunnion 304, channels having circular cross-sections are formed. In some embodiments, the grooves 312 of the drive tube 302 may have a cross-section that is greater than a semicircle and the grooves 314 of the swashplate trunnion 304 may have a cross-section that is less than a semicircle, such that, when mated, channels having circular cross-sections are formed. The grooves 312 may extend along, or at least partially along, a length of the drive tube 302. In another example, the In addition to being made of any suitable material, the drive tube 302 may further include a coating (not shown). For example, the outer surface 322 of the drive tube 302, including the grooves 312, may be coated with Keronite® (such as Keronite® BO or Keronite® P050), Keronite® with a solid film lubricant or other suitable friction modifier (such as Keronite® BO with a solid film lubricant or Keronite® P050 with a solid film lubricant), Tufram®, hard anodize with Teflon®, Karon® V, any other suitable coating, or any combination of the preceding. In particular embodiments, the coating of the drive tube 302 may further provide better wear and/or tear resistance. In another example, the coating may further prevent the drive tube 302 from having to be lubricated on a periodic basis.

The swashplate trunnion 304 may be made of any suitable material. For example, the swashplate trunnion 304 may be made of aluminum, aluminum alloys, titanium, titanium alloys, carbon steel, blue-tempered carbon steel, stainless steel, nickel based alloys, any other metal, or any combination of the preceding. The plurality of grooves 314 may be formed on the inner surface 324 of the swashplate trunnion 304 using any suitable technique, for example, by machining. The plurality of grooves 314 on the swashplate trunnion 304 may have any suitable size and shape, which may depend on the size and shape of the cylindrical bearings 306. For example, the grooves 314 of the swashplate trunnion 304 may have a semicircle cross section, such that, when mated with the grooves 312 of the drive tube 302, channels having circular cross-sections are formed. In some embodiments, the grooves 314 of the swashplate trunnion 304 may have a cross-section that is greater than a semicircle and the grooves 312 of the drive tube 302 may have a cross-section that is less than a semicircle, such that, when mated, channels having circular cross-sections are formed. The grooves 314 may extend along, or at least partially along, a length of the swashplate trunnion 304. In addition to being made of any suitable material, the swashplate trunnion 304 may further include a coating (not shown). For example, similar to the drive tube 302, the inner surface 324 of the swashplate trunnion 304, including the grooves 314, may be coated with Keronite® (such as Keronite® BO or Keronite®

P050), Keronite® with a solid film lubricant or other suitable friction modifier (such as Keronite® BO with a solid film lubricant or Keronite® P050 with a solid film lubricant), Tufram®, hard anodize with Teflon®, Karon® V, any other suitable coating, or any combination of the preceding. In particular embodiments, the coating of the swashplate trunnion 304 may further provide better wear and/or tear resistance. In another example, the coating may further prevent the swashplate trunnion 304 from having to be lubricated on a periodic basis.

The cylindrical bearings 306 may be made of any suitable material. For example, the cylindrical bearings may be made of aluminum, aluminum alloys, titanium, titanium alloys, carbon steel, blue-tempered carbon steel, stainless steel, nickel based alloys, any other metal, or any combination of the preceding. In addition to being made of any suitable material, the cylindrical bearings 306 may further include a coating (not shown), such as a machinable self-lubricating liner, a plastic, a low friction material, a ceramic, or polytetrafluoroethylene.

Figure 4:
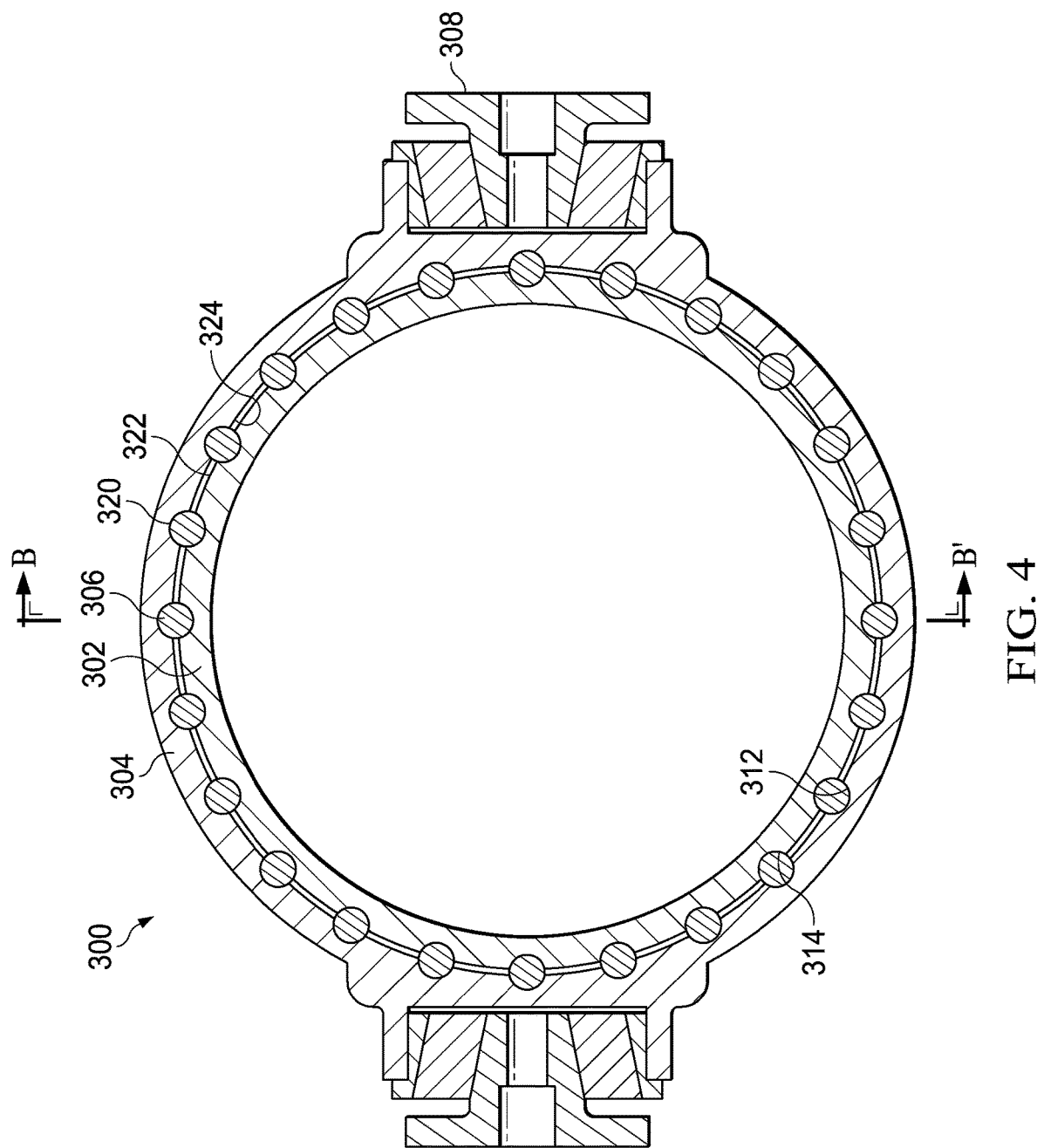
FIG. 4 is a cross-sectional view of FIG. 3 along the A-A' line, in accordance with various embodiments.

FIG. 4 is a cross-sectional view of FIG. 3 along the A-A' line, in accordance with various embodiments. The drive tube and swashplate trunnion assembly 300 includes a drive tube 302 having an outer surface 322, a swashplate trunnion 304 around the outer surface 322 of the drive tube 302, a plurality of cylindrical bearings 306, and a trunnion 308. The drive tube 302 includes a plurality of grooves 312 on an outer surface 322 of the drive tube 302. The swashplate trunnion 304 includes a plurality of grooves 314 on an inner surface 324 of the swashplate trunnion 304. The plurality of grooves 312 of the drive tube 302 and the plurality of grooves 314 of the swashplate trunnion 304 are mated to form channels 320 to contain the cylindrical bearings 306. Although FIG. 4 depicts the grooves 312, 314 as having equal cross-sectional dimensions, the grooves 312, 314 may have different cross-sectional dimensions.

Figure 5:
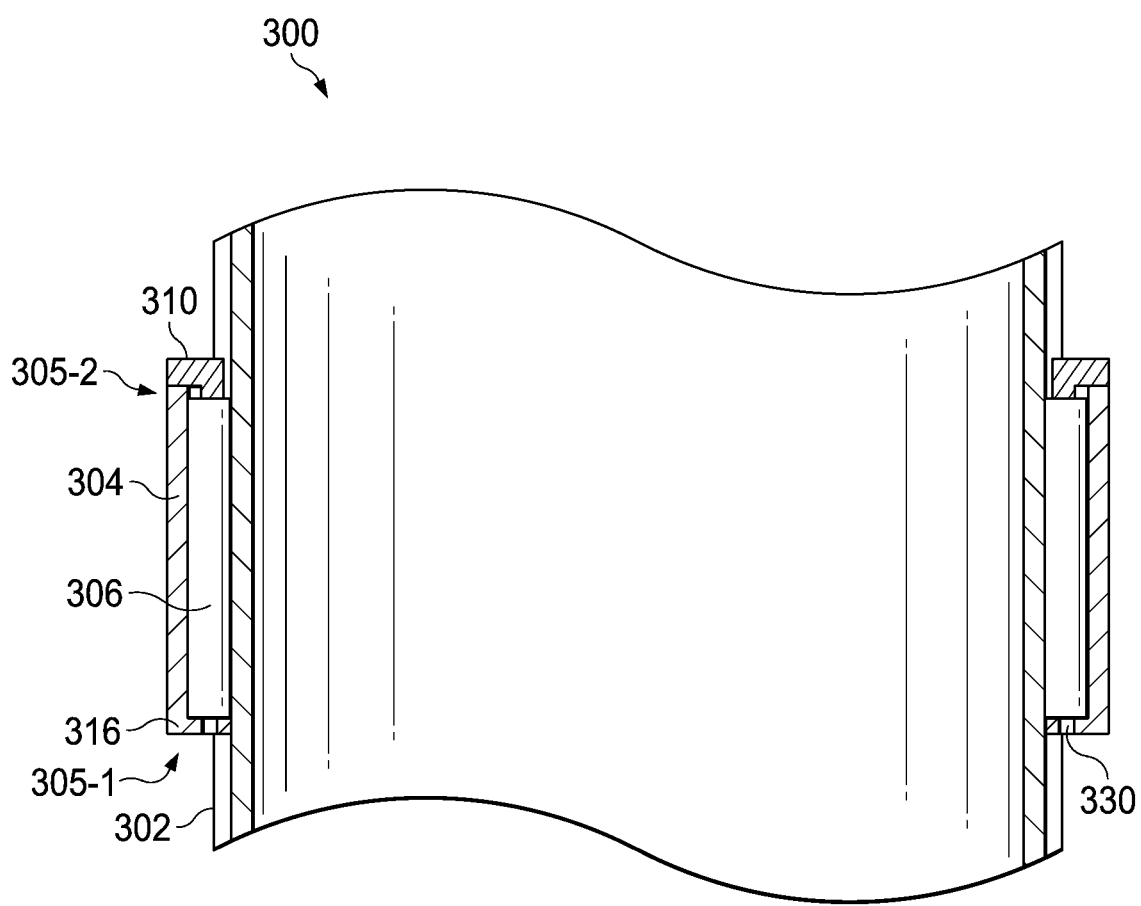
FIG. 5 is cross-sectional view of FIG. 4 along the B-B' line, in accordance with various embodiments.

FIG. 5 is cross-sectional view of FIG. 4 along the B-B' line, in accordance with various embodiments. The drive tube and swashplate trunnion assembly 300 includes a drive tube 302, a swashplate trunnion 304 around the drive tube 302, a channel 320 having a cylindrical bearing 306 disposed therein, a cap 310 on a top surface 305-2 of the swashplate trunnion 304, a base 316 on bottom surface 305-1 of the swashplate trunnion 304, and an orifice 330 in the base 316.

Figure 6:
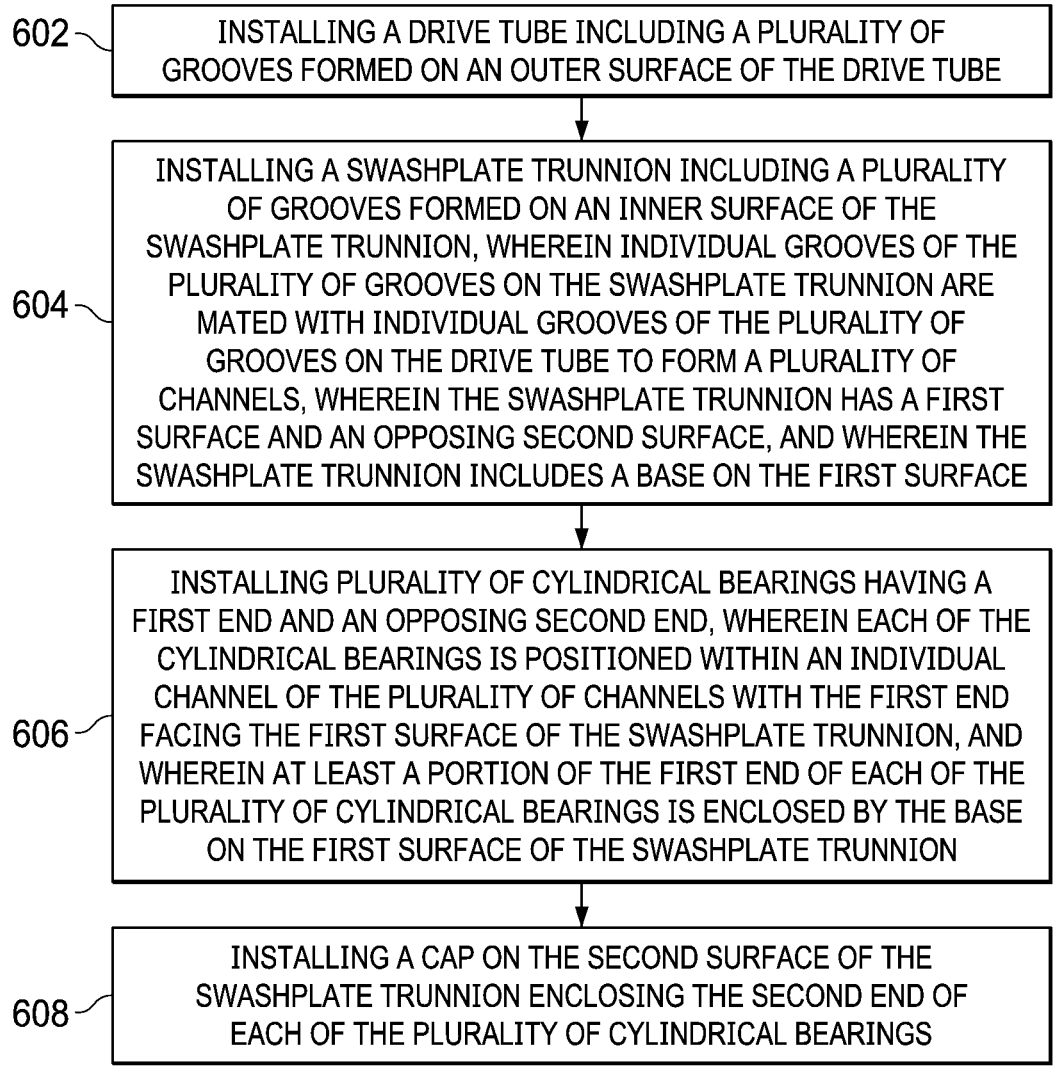
FIG. 6 is a simplified flow diagram illustrating potential operations for assembling an exemplary a drive tube and swashplate trunnion assembly, in accordance with various embodiments.

FIG. 6 is a simplified flow diagram illustrating potential operations for assembling an exemplary a drive tube and swashplate trunnion assembly, in accordance with various embodiments. At 602, a drive tube including a plurality of grooves formed on an outer surface of the drive tube is installed. At 604, a swashplate trunnion including a plurality of grooves formed on an inner surface of the swashplate trunnion and a base on a first surface is installed, such that the individual grooves of the plurality of grooves on the swashplate trunnion are mated with individual grooves of the plurality of grooves on the drive tube to form a plurality of channels. At 606, a plurality of cylindrical bearings, having a first end and an opposing second end, are installed. An individual cylindrical bearing of the plurality of cylindrical bearings is positioned within an individual channel of the plurality of channels with the first end facing the first surface of the swashplate trunnion, such that at least a portion of the first end of each of the plurality of cylindrical bearings is enclosed by the base on the first surface of the swashplate trunnion. At 608, a cap is installed on the second surface of the swashplate trunnion enclosing the second end of each of the plurality of cylindrical bearings.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. A drive tube and swashplate trunnion assembly, comprising:
   a drive tube including a plurality of grooves formed on an outer surface of the drive tube;
   a swashplate trunnion including a plurality of grooves formed on an inner surface of the swashplate trunnion, wherein individual grooves of the plurality of grooves on the swashplate trunnion mate with individual grooves of the plurality of grooves on the drive tube to form a plurality of channels, and wherein the swashplate trunnion has a first surface and an opposing second surface;
   a plurality of cylindrical bearings, wherein:
      each of said cylindrical bearings is disposed within an individual channel of the plurality of channels;
      each of said cylindrical bearings has a first end and an opposing second end; and
      each of said cylindrical bearings is positioned within an individual channel of the plurality of channels with the first end facing the first surface of the swashplate trunnion;
   a base on the first surface of the swashplate trunnion enclosing at least a portion of the first end of each cylindrical bearing of the plurality of cylindrical bearings; and a plurality of orifices on the base, wherein each orifice exposes at least a portion of the first end of a respective cylindrical bearing of the plurality of cylindrical bearings.

2. The drive tube and swashplate trunnion assembly of claim 1, further comprising:
a cap on the second surface of the swashplate trunnion enclosing the second end of each of the plurality of cylindrical bearings.

3. The drive tube and swashplate trunnion assembly of claim 2, wherein the cap is a ring having an inner diameter greater than an outer diameter of the drive tube and an outer diameter greater than or equal to an outer diameter of the swashplate trunnion.

4. The drive tube and swashplate trunnion assembly of claim 1, further comprising:
a coating on the plurality of cylindrical bearings.

5. A method for assembling a drive tube and swashplate trunnion assembly, comprising:
installing a drive tube including a plurality of grooves formed on an outer surface of the drive tube;
installing a swashplate trunnion including a plurality of grooves formed on an inner surface of the swashplate trunnion, wherein individual grooves of the plurality of grooves on the swashplate trunnion are mated with individual grooves of the plurality of grooves on the drive tube to form a plurality of channels, wherein the swashplate trunnion has a first surface and an opposing second surface, and wherein the swashplate trunnion includes a base on the first surface; and
installing a plurality of cylindrical bearings having a first end and an opposing second end, wherein:
each of the cylindrical bearings is positioned within an individual channel of the plurality of channels with the first end facing the first surface of the swashplate trunnion;
at least a portion of the first end of each cylindrical bearing of the plurality of cylindrical bearings is enclosed by the base on the first surface of the swashplate trunnion;
the base includes a plurality of orifices; and
each orifice of the plurality of orifices exposes at least a portion of the first end of a respective cylindrical bearing of the plurality of cylindrical bearings.

6. The method of claim 5, further comprising:
installing a cap on the second surface of the swashplate trunnion enclosing the second end of each of the plurality of cylindrical bearings.

7. The method of claim 6, wherein the cap is a ring having an inner diameter greater than an outer diameter of the drive tube and an outer diameter greater than or equal to an outer diameter of the swashplate trunnion.

8. The method of claim 5, wherein the plurality of cylindrical bearings includes a coating.

9. An aircraft rotor assembly, comprising:
a drive tube including a plurality of grooves formed on an outer surface of the drive tube;
a swashplate trunnion including a plurality of grooves formed on an inner surface of the swashplate trunnion, wherein individual grooves of the plurality of grooves on the swashplate trunnion mate with individual grooves of the plurality of grooves on the drive tube to form a plurality of channels, and wherein the swashplate trunnion has a first surface and an opposing second surface;
a plurality of cylindrical bearings, wherein:
each of said cylindrical bearings is disposed within an individual channel of the plurality of channels;
each cylindrical bearing of the plurality of cylindrical bearings has a first end and an opposing second end; and
each cylindrical bearing of the plurality of cylindrical bearings is positioned within an individual channel of the plurality of channels with the first end facing the first surface of the swashplate trunnion;
a base on the first surface of the swashplate trunnion enclosing at least a portion of the first end of each cylindrical bearing of the plurality of cylindrical bearings; and
a plurality of orifices on the base, wherein each orifice exposes at least a portion of the first end of a respective cylindrical bearing of the plurality of cylindrical bearings.

10. The aircraft rotor assembly of claim 9, further comprising:
a cap on the second surface of the swashplate trunnion enclosing the second end of each of the plurality of cylindrical bearings.

11. The aircraft rotor assembly of claim 10, wherein the cap is a ring having an inner diameter greater than an outer diameter of the drive tube and an outer diameter greater than or equal to an outer diameter of the swashplate trunnion.

12. The aircraft rotor assembly of claim 9, further comprising:
a coating on the plurality of cylindrical bearings.

13. The aircraft rotor assembly of claim 9, further comprising:
a coating on the plurality of grooves formed on the outer surface of the drive tube.

14. The aircraft rotor assembly of claim 9, further comprising:
a coating on the plurality of grooves formed on the inner surface of the swashplate trunnion.

* * * * *